(12) United States Patent
Mathes et al.

(10) Patent No.: US 6,228,342 B1
(45) Date of Patent: May 8, 2001

(54) PROCESS FOR THE PRODUCTION OF SODIUM PERCARBONATE

(75) Inventors: Manfred Mathes; Werner Doetsch, both of Bad Hoenningen (DE)

(73) Assignee: Solvay Interox GmbH, Hannover (DE)

( * ) Notice: Subject to any disclaimer, the term of this patent is extended or adjusted under 35 U.S.C. 154(b) by 0 days.

(21) Appl. No.: 09/011,043
(22) PCT Filed: Sep. 4, 1996
(86) PCT No.: PCT/EP96/03871
§ 371 Date: Feb. 6, 1998
§ 102(e) Date: Feb. 6, 1998
(87) PCT Pub. No.: WO97/10173
PCT Pub. Date: Mar. 20, 1997

(30) Foreign Application Priority Data

Sep. 11, 1995 (DE) .............................. 195 33 524

(51) Int. Cl.⁷ .................................... C01B 15/10
(52) U.S. Cl. ........................................ 423/415.2
(58) Field of Search ........................... 423/415.2

(56) References Cited

U.S. PATENT DOCUMENTS

| 3,555,696 | 1/1971 | Pistor et al. | 34/9 |
| 3,801,706 | 4/1974 | Sack | 423/421 |
| 3,860,694 | 1/1975 | Jayawant | 423/307 |
| 3,917,663 | * 11/1975 | Kegelart et al. | 423/415.2 |
| 5,294,427 | * 3/1994 | Sasaki et al. | 423/415.2 |

FOREIGN PATENT DOCUMENTS

| 070711 | 7/1982 | (EP) . |
| 1238528 | 7/1960 | (FR) . |
| 2016936 | 5/1970 | (FR) . |
| 2197811 | 8/1973 | (FR) . |

* cited by examiner

*Primary Examiner*—Stuart L. Hendrickson
(74) *Attorney, Agent, or Firm*—Evenson, McKeown, Edwards & Lenahan, P.L.L.C.

(57) ABSTRACT

A flexible process for production of homogeneous sodium precarbonate particles or granules according to which a reaction slurry with an average to high solids content is prepared initially from an aqueous hydrogen peroxide solution of up to maximum 50% by weight and solid soda, this reaction slurry, which optionally may be finely ground by wet comminution, being subsequently subjected immediately to short-term drying, preferably spray drying, and, optionally, granulation. The process enables production, in an efficient manner, of essentially homogeneous sodium percarbonate particles or granules with variable active oxygen contents of 10 to 14.5% by weight and grain sizes and bulk densities which are variable within wide ranges.

13 Claims, No Drawings

PROCESS FOR THE PRODUCTION OF SODIUM PERCARBONATE

BACKGROUND OF THE INVENTION

The present invention relates to a process for the production of homogeneous, particulate sodium percarbonate (hereinafter abbreviated to "PCS") with active oxygen contents of at least 10% by weight, in particular 13.5 to 14.5% by weight.

Sodium percarbonate is used as the bleaching component in washing, bleaching and cleaning agents in powder form. It is characterized by a high solubility in water and rapid liberation of the hydrogen peroxide and is environment-friendly since its decomposition products do not pollute the environment.

In the literature, the empirical formula $Na_2CO_3.1.5\ H_2O_2$ is given for sodium percarbonate with a theoretical active oxygen content of 15.28% by weight. However, in this respect it should not be forgotten that sodium percarbonate produced on an industrial scale from hydrogen peroxide and soda generally is not such a well-defined homogeneous compound but, on the one hand, a mixture of different compounds containing water of hydration with the formulae $Na_2CO_3.1.5\ H_2O_2$ $Na_2CO_3.1.5\ H_2O_2.H_2O$ $Na_2CO_3.2\ H_2O_2.H_2O$ $Na_2CO_3.2\ H_2O_2$ $Na_2CO_3.x\ H_2O_2$ and, on the other hand, depending on the production process, additionally also contains a certain proportion of non-oxidized soda and other production-dependent additives such as sodium sulphate or common salt. The properties of the product are decisively influenced both by the production conditions and the additives concerned not only with respect to the stability but also with regard to e.g. the active oxygen content, the solubility and the bulk density or the grain size of the sodium percarbonate. The active oxygen content thus achievable in industrially produced sodium percarbonate thus amounts to 13.4 to 14.5% by weight only in advantageous cases, but is frequently much lower due to production-dependent additives (sulphate, common salt) and stabilizing measures. The satisfactory solubility of sodium percarbonate, too, is often reduced, e.g. by the production-dependent presence of other salts such as soda, sodium sulphate and common salt. Moreover, the bulk density or grain size of the sodium percarbonate that is achievable in the production processes according to the state of the art is generally only slightly variable and is usually restricted from the beginning to narrow value ranges as a result of the type of process or the soda used.

Increasingly, however, there is a requirement for sodium percarbonates with a high active oxygen content and different bulk densities or grain sizes, in line with the different requirements of the washing agent manufacturers e.g. for use in light powder detergents with a low bulk density or in compact detergents with a high bulk density of the washing, bleaching and cleaning agent components. In this respect it is in particular necessary to match the bulk densities of the individual components of such compositions in order to largely eliminate segregation which would necessarily occur with different bulk densities of the components.

For the production of sodium percarbonate three different techniques are known according to the state of the art: crystallization processes, spray processes and dry processes.

As a rule, sodium percarbonate is produced by the crystallization process. For this purpose, a solution or suspension of soda is reacted with hydrogen peroxide at 10 to 20° C. and crystallized in the presence of stabilizers such as water glass, inorganic or organic phosphonic acids etc. Because of the high solubility of sodium percarbonate, however, it is necessary to salt out the sodium percarbonate from the reaction mixture in order to increase the yield, common salt in a concentration of approximately 240 g/l being preferably introduced into the reaction mixture according to the state of the art. However, the crystallization process is difficult to control so that it is recommended to add the so called crystallization improvers such as polyphosphate or polyacrylate in order to form an advantageous crystal load. The crystallized sodium percarbonate is then removed by centrifuging and dried by the usual processes, e.g. in the fluid bed. However, the PCS obtained by the crystallization process is not the optimum one for many applications.

Spray processes for the production of sodium percarbonate are described in the patent literature e.g. in GB 722 351 and U.S. Pat. Nos. 3,555,696 and 3,801,706. In these processes it is not necessary to filter or centrifuge in order to remove the sodium percarbonate from the mother liquor. Instead, an aqueous solution (or, if necessary, a low concentration suspension) of soda and hydrogen peroxide is dried in a spray dryer in the case of these processes. As a rule, however, spray dried products have a very low bulk density of only approximately 0.35 kg/l and can therefore not be used as such for present day washing agent formulations which increasingly contain granular components with elevated bulk densities. In addition, the spray drying process poses the problem that a strong tendency to caking is observed, particularly when suspensions are used. In some cases, this has a considerable negative effect on the spray process since frequent cleaning of the clogged nozzles is required or spraying of the solution becomes altogether impossible. The spray drying processes of the state of the art consequently preferably operate with solutions. According to GB 722 351 for example, a mixture of soda solution and hydrogen peroxide is passed into the spray dryer before a possible crystallization of PCS begins.

However, when dilute solutions are sprayed, a large quantity of water needs to be removed requiring additional energy expenditure. When an attempt is made to increase the temperature of the feed solution to the spray dryer in order to increase the solubility, increasing decomposition processes are observed in the feed solution, according to U.S. Pat No. 3,555,696. This leads to active oxygen losses and to irregularities in the spray process. To solve this problem, U.S. Pat. No. 3,555,696 suggests that the feed solution to the spray dryer be produced only from stable base compounds (soda) and hydrogen peroxide be introduced into this feed solution immediately before spraying. However, in the case of this process, too, the soda concentration of approximately 20% by wt. remains low and to avoid decomposition processes, low drying temperatures are used which are not particularly suitable in practice (inlet 73° C., outlet 46° C.). In addition, the process is difficult to control.

According to the process of U.S. Pat. No. 3,801,706, a feed mixture for the spray dryer is produced by mixing an aqueous hydrogen peroxide solution of at least 40% by wt. with a soda solution essentially saturated at 20–25° C., which mixture already contains part of the PCS formed in the crystallized form. However, the process is not yet an optimal one since the PCS content of the feed mixture does not exceed approximately 20% by weight.

As a variation of the spray process, solutions of soda and hydrogen peroxide, for example, are continuously sprayed onto a bed of sodium percarbonate fluidized with hot air. The spray and the drying stage can be carried out alternatively in a single or in two stages. According to another variation of the spray process, solutions of sodium carbonate and hydrogen peroxide are sprayed through separate nozzles into a reaction chamber, a hot mixture of air and carbon dioxide being passed simultaneously through the reaction chamber. According to this process, a fairly porous sodium percarbonate is obtained which does not satisfy the requirements for a washing agent composition of present-day standard with respect to its bulk density and attrition resistance.

According to the so-called dry processes, sodium percarbonate is produced by reacting anhydrous or hydrated sodium carbonate (with 75 to 90% by wt. $Na_2CO_3$) with a concentrated hydrogen peroxide solution of 50–80% by wt. and evaporating the small quantities of liberated water during the reaction. In the case of this process, an essentially (largely) dry reaction mixture is present throughout the entire reaction. The process can, for example, be carried out in mixers, fluid bed reactors or in tubular reactors with input spray devices for $H_2O_2$. Apart from long reaction periods, this process has the disadvantage that no purification of the sodium carbonate produced in this way takes place so that additional measures for stabilizing the product, e.g. an addition of special stabilizers, need to be taken during the reaction. In addition, this process is variable to a limited extent with respect to the granulating properties of the sodium percarbonate, e.g. with regard to the bulk density and the grain size, since the shape of the sodium percarbonate granules correspond essentially (i.e. apart from a slight roundedness attributable to the reaction) to the granular form of the soda used. For the production of sodium percarbonate granules with a high bulk density for compact washing agents, in particular, heavy soda therefore needs to be used which, however, provides little surface area for the reaction with hydrogen peroxide. Consequently, the reaction is incomplete so that only low active oxygen contents and only non-homogeneous products with a high unevenly distributed soda content are obtained whose alkalinity reduces the stability of the product.

SUMMARY OF THE INVENTION

It is the object of the present invention to overcome the disadvantages of the state of the art with respect to the production of sodium percarbonate and to provide an efficiently realizable production process with a high degree of flexibility which makes it possible to provide high value sodium percarbonate with variable, in particular high active oxygen contents and variable granule parameters suitable for the intended application.

This object is achieved by the process according to the invention for the production of sodium percarbonate.

The process according to the invention for the production of homogeneous, particulate sodium percarbonate with an active oxygen content of at least 10% by wt. is characterized in that, in a first step a) a reaction slurry or reaction paste with solids contents of approximately 32–75% by wt. (i.e. dry substance, in particular PCS content) is prepared from a 10 to 50% by wt. aqueous hydrogen peroxide solution and solid sodium carbonate (soda) with intensive mixing and maintaining of reaction temperatures at maximum 80° C., preferably maximum 40° C., and subsequently, in a second stage b) the reaction slurry formed is subjected to short-term drying and, if necessary, simultaneous and/or subsequent granulation, to obtain the particulate sodium percarbonate with the desired grain size and bulk density. In step a), the solid soda is metered into the hydrogen peroxide solution introduced, in 1.1 (for the lower active oxygen content) to 0.6-fold (for higher active oxygen contents) molar quantities, based on the $H_2O_2$ used. Taking other common additives into consideration, such as common stabilizers and, if necessary, granulating aids already added, the proportion of water in the PCS suspension (slurry) produced amounts to maximum approximately 68% by wt. (use of 10% by wt. $H_2O_2$ solution) to 25% by wt. (use of 50% by wt. $H_2O_2$). When an approximately 30–35% by wt. $H_2O_2$ solution is used, the water content of the PCS slurry is only approximately 40% by wt.

The above process according to the invention differs considerably from the processes according to the state of the art. The process according to the invention differs from the crystallization processes which operate with solutions or suspensions with a low solids content (solids contents of maximum approximately 15 to 20% by wt. soda) and have the drawback of a difficultly controllable crystallization and a high energy expenditure for water removal, in that the reaction slurry (the reaction paste) produced in reaction step a) exhibits considerably higher solids contents that those in the crystallization processes. In addition, the process according to the invention (as so-called slurry process) also differs considerably from the dry processes described in the state of the art. In contrast to the dry processes according to the state of the art which use solid soda and highly concentrated hydrogen peroxide (at least 50% by wt.) and according to which the reaction and drying are carried out in one step (simultaneously) (i.e. an essentially dry reaction mixture is produced), a distinctly moist, highly pumpable mass (slurry or paste) is present according to the process of the invention which slurry, apart from its solids content of soda to be converted or sodium percarbonate already formed, exhibits a moderate proportion of water. According to the process of the invention it is consequently not necessary to use such highly concentrated hydrogen peroxide as in the dry process; instead, concentrations of up to max. 50% by wt., e.g. hydrogen peroxide solutions of 25 to 50% by wt., are used; in particular, hydrogen peroxide solutions with $H_2O_2$ concentrations of less than 40% by wt. are used. Although slightly more water needs to be eliminated according to the process of the invention than according to the dry process, the slight additional increase in the energy consumption thus caused is more than compensated for by the other advantages of the process according to the invention. The process according to the invention for the production of sodium percarbonate maintains an advantageous well-balanced equilibrium between the solids and the moisture content (water content) in the reaction mixture and consequently leads to optimum results and properties of the product produced.

DETAILED DESCRIPTION OF PREFERRED EMBODIMENTS

According to the process of the invention, a sodium percarbonate with a variable active oxygen content (Avox content) can be produced. For the active oxygen contents to be achieved in each case in the PCS, aqueous hydrogen peroxide solutions with different $H_2O_2$ concentrations are used. To produce high Avox contents of approximately 13.5 to 14.5% by wt., 25–50% by wt. hydrogen peroxide solutions are consequently used, the upper limit, however, being in particular below 40% by wt.; hydrogen peroxide concentrations of 25–35% by wt. are suitable, concentrations of 30–35% by wt. having proved to be highly advantageous. For PCS with a moderate Avox content of between 11 and 13.5% by wt., 12–20% by wt. hydrogen peroxide solutions are used as a rule. For PCS with a low active oxygen content of 10 to approximately 11% by wt., correspondingly dilute hydrogen peroxide solutions with an $H_2O_2$ concentration of approximately 10–12% by wt. are suitable.

In particular, the fact that the process according to the invention is a two-stage process permits the most advantageous conditions to be adjusted both for the reaction which is completed within short periods of in particular less than 2 hours (preferably e.g. within a few minutes to approximately 0.5 to 1 hour) and for drying. In this process, it is possible for a combined granulation to take place in an advantageous manner during drying itself to form granular sodium percarbonate with a controlled bulk density or grain size by using, as short term dryer, e.g. an intensive mixer with a granulating facility or a spray dryer with integrated fluid bed. Granulating aids, e.g. silicates and other common binders can be added, if necessary, to the PCS slurry before and/or during drying with simultaneous granulation.

The process according to the invention is independent of the type of soda to be used. For example, it is possible to use super-light soda with bulk densities of less than 0.50 kg/l, e.g. 0.20 kg/l to 0.48 kg/l, lightly calcined soda with a bulk density of e.g. 0.50 to 0.55 kg/l and heavy calcined soda with a bulk density of 1.0 to 1.1 kg/l. The process using the light forms of soda is particularly advantageous, for example in particular using light soda with bulk densities of approximately 0.50 to 0.55 kg/l. Light forms of soda can be processed to a particularly homogeneous sodium percarbonate with largely complete conversion of the soda used with hydrogen peroxide. The use of light forms of soda permits a rapid and complete conversion which is completed within a few minutes to maximum approximately 1.5 hours, in particular within 1 hour. However, even when heavy calcined soda is used, short reaction times and largely homogeneous PCS particles can be obtained compared with the processes according to the state of the art, since a medium with a sufficient water content is present as a result of the moisture or water content of the reaction slurry, as a result of which reaction, re-solution and re-crystallization processes are promoted in an advantageous manner. Compared with drying processes, an increased penetration of hydrogen peroxide through the heavy forms of soda used and consequently the formation of a homogeneous sodium percarbonate with higher active oxygen contents is assured.

The execution of step a) according to the process of the invention can take place in any mixer which permits a sufficiently rapid and consequently intensive mixing of solid (in particular soda and PCS formed) and hydrogen peroxide used. The following mixers are suitable, for example: agitated vessels with agitator types suitable for media capable of flowing, e.g. with propeller, disc, flat plate paddle, straight-arm paddle or gate paddle agitator; intensive mixers are highly effective, e.g. high speed rotor-stator agitators and turbine impeller mixer which may additionally be equipped with a cutter head for comminution of larger agglomerates. More rapid or intensive mixing should be understood to be any mixing intensity which corresponds to an agitator speed of initially at least approximately 100 rpm, in particular at least approximately 250 rpm; for higher solids contents, mixing intensities are appropriate which correspond to speeds of approximately 500 to 800 rpm. The introduction of the solid soda into the mixer takes appropriately place by means of a metering screw.

In order to control the temperature of the exothermic reaction between soda and hydrogen peroxide, the mixer used can be equipped with cooling devices. This is useful in particular when, according to a preferred embodiment of the invention, the conversion in step a) is to begin at an initial temperature below room temperature, preferably at a temperature of from 3 to 10° C., in order to preserve the active oxygen content of the hydrogen peroxide. In the course of the reaction, the reaction temperature may rise to temperatures below 80° C. without the properties of the product, in particular the active oxygen content, suffering as a result. Temperatures exceeding 80° C., however, should be avoided since, otherwise, the active oxygen yield is adversely affected by the premature decomposition of hydrogen peroxide. For cooling which can appropriately take place via a simple cooling jacket, the cooling capacity of tap water is usually sufficient so that, as a rule, no further energy needs to be applied for cooling.

The ratio of soda to the active oxygen content of the hydrogen peroxide is controlled according to the process of the invention in such a way that the molar ratios correspond to the active oxygen content to be achieved in the PCS, while a slight excess of hydrogen peroxide of the order of magnitude of up to 10% may be present. With molar ratios of $H_2O_2$ to soda of approximately 0.9 (=1:1.1), sodium percarbonates with active oxygen contents of approximately 10% by wt. are obtained. According to a preferred embodiment of the invention, the molar ratio of $H_2O_2$ to soda is adjusted to approximately 1.5 to 1.65 (=1:0.67 to 1:0.6) such that an active oxygen content of at least 13.5% by wt., in particular of 13.5 to 14.5% by wt. is achieved in the sodium percarbonate.

The short-term drying and, if necessary, combined granulation of the reaction slurry obtained in step a), which take place in step b), can follow the first reaction step directly, e.g. when a granulating dryer such as a turbo dryer is used as short-term dryer. Moreover, the process can be carried out both batchwise or continuously.

The execution of the drying and granulation step can be carried out not only in the preferred turbo dryer (granulating dryer) but also in other commonly used, short-term drying or granulation facilities, under the usual conditions. Drying can thus also be carried out in fluid bed dryers, in atomization dryers or as in any other preferred variation of the invention described below in further detail, in a-spray dryer (if necessary also with integrated fluid bed). Granulation can take place in the usual way in all process variations of the invention, e.g. as dry granulation in a compacting process or as damp granulation (agglomeration granulation) in granulating mixers such as plough share mixers, Loediger mixers or V mixers.

A preferred embodiment of the combined granulation and drying step comprises the operation in a turbo dryer which, basically, is a turbo mixer equipped with a heating device. The method of operation in the turbo dryer is recommended in particular for continuous processes in which the reaction slurry or the reaction paste is dried directly after conversion and simultaneously granulated. In the granulation/drying step, granulation aids (such as silicates) and stabilizers (such as organic phosphonic acids or phosphonates) can be added, if necessary. Depending on the device used, drying and granulation can be controlled in such a way that a sodium percarbonate with any desired grain size between approximately 150 and approximately 1300 µm can be produced. According to a preferred embodiment of the invention, sodium percarbonates with grain sizes of 350 to 1300 µm are produced in particular. The process according to the invention consequently makes it possible to produce sodium percarbonates with grain size ranges for light detergents or for compact detergents with grain sizes of more than 650 µm, preferably with grain sizes of approximately 800 to 1000 μm. The granulation conditions which need to be maintained for this purpose are not critical as such and correspond to the usual conditions of the granulation equipment used in each case. According to the process of the invention, it is thus possible to produce sodium percarbonates with a bulk density of 0.2 kg/l to 1.1 kg/l, preferably of 0.5 to 1.1 kg/l.

The sodium percarbonate granules produced according to the process of the invention can optionally be provided in a known manner with coatings. Suitable coating materials are e.g. the materials described in the state of the art such as borates, salts such as $Na_2CO_3$, NaCl, $Na_2SO_4$ and the mixtures thereof, organic coating agents such as lactobionic acid and the derivatives thereof.

If an additional coating of the sodium percarbonate granules produced according to the invention is desirable, the coating process can appropriately be combined with the granulation/drying step, e.g. by adding the coating agent to the reaction slurry obtained in process step a) (.e.g during an ageing period or directly before the second process step). It is also possible to add the coating material only during the granulation/drying step, e.g. in the last phase of this process step.

According to another preferred variation of the process according to the invention for the production of sodium percarbonate particles, a spray dryer is used as short-term dryer. In this case, it is recommended to grind the reaction slurry obtained in step a) extremely finely in a wet comminution facility and to pass it to the spray dryer immediately thereafter. The process according to the invention of this variation for the production of sodium percarbonate particles (PCS particles) is consequently characterized in that a) an aqueous hydrogen peroxide solution of 10 to 50% by weight, depending on the desired active oxygen content of the PCS particles to be produced, is introduced into a receiving vessel and approximately 1.1 to 0.6 times the molar amount, based on the $H_2O_2$ used, of solid soda is metered in with intensive mixing at temperatures of maximum 80° C., and after a sufficient reaction period b1) from the reaction mixture obtained according to a), an extremely finely ground, homogeneous particle suspension is formed by wet comminution and b2) essentially homogeneous PCS particles with an active oxygen content of at least 10% by weight are obtained immediately afterwards by spray drying the particle suspension obtained according to b1).

Process step a) is carried out in this case as described above in general in connection with the process according to the invention. Wet comminution in step b1) can be carried out with any wet comminution facility commonly used as such, allowing extremely fine grinding of flowable and pumpable aqueous suspensions of solid particles. Colloidal mills which are generally used for the comminution of flowable suspensions are particularly suitable for this purpose. Such colloidal mills are in particular high speed wet mills with conical or disc-type rotor-stator arrangements (perforated discs, corundum discs, toothed discs) whose grinding clearance is preferably constructed to be adjustable. The "extremely fine" fineness range which can be achieved with such colloidal mills implies comminution of the particles to approximately 1–30 μm. The extremely finely ground, homogeneous particle suspension obtained in step b1) can be sprayed highly satisfactorily in spite of the high solids content of preferably approximately 32% by weight (production of PCS with 10% by wt. active oxygen; use of 10% by wt. $H_2O_2$ solution) to 63% by wt. (production of PCS with 14.5% by wt. active oxygen; use of 35% by wt. $H_2O_2$ solution) without any caking or clogging of the spray nozzles being observed. If desired, it is possible in the case of this variation of the invention, to carry out spray drying in a spray dryer with an integrated fluid bed. In this case, it is possible to achieve a certain level of granulation of the PCS particles already in this stage. In this process, granulation should be promoted by the addition of suitable granulating aids. Water glass, for example, can be added as granulating aid; appropriately, water glass is added only immediately in front of the colloidal mill or, if required, only in the fluid bed part of the spray dryer. For this purpose, water glass is added in particular in quantities of up to maximum 3% by wt. (as $SiO_2$ based on the dry substance in the slurry). Additions of water glass in quantities of approximately 1% by wt. are appropriate, while the total water glass content of the slurry should in particular not exceed 2% by wt.

Apart from a spray dryer with an integrated fluid bed, it is also possible to carry out the granulation process after the drying step b2) in granulation facilities such as those described above, in the usual manner.

The variation of the process according to the invention using a spray dryer also can be carried out batchwise or continuously. In the case of the continuous execution, a reaction slurry is initially produced in the receiving vessel and the reaction slurry is withdrawn after a sufficient initial reaction period (residence time) and passed to process steps b1) and b2) while, simultaneously, fresh aqueous hydrogen peroxide solution in the required concentration and the corresponding quantity of solid soda are metered simultaneously into the receiving vessel; the streams of starting materials and/or the reaction product (slurry) are operated in the known way in a dynamic equilibrium and the corresponding process parameters such as temperature and residence time are continuously monitored.

The process according to the invention is distinguished by the following advantages:

By means of the invention, a simple process which is economic to carry out is provided for the batchwise and continuous production of essentially homogeneous PCS particles or granules with variable active oxygen contents of 10–14.5% by wt. The process according to the invention operates in an energy conserving manner since, on the one hand, no refrigeration energy is required during process step a), it being possible to control the temperature merely by means of normal water cooling, and, on the other hand, less water needs to be evaporated in step b) in comparison with the spray drying processes according to the state of the art. In contrast to the so-called wet processes (crystallization processes), chloride-free PCS products are formed according to the invention as a result of which the risk of corrosion in the plant is avoided. In contrast to the wet process, no effluent requiring elimination is formed in the process according to the invention; in the wet process, on the other hand, chloride-containing effluent is formed which requires neutralization before disposal. In contrast to the so-called dry processes which merely permit active oxygen contents of approximately 10% by wt. in PCS, a variable active oxygen content of 10–14.5% by wt. can be adjusted according to the process of the invention. According to the slurry process of the invention, the active oxygen content in the PCS can thus be easily controlled and adjusted to the market requirements or different products. The PCS produced according to the process of the invention is additionally characterized by a higher homogeneity. The PCS particles obtainable according to the invention consequently possess advantageous stability properties even though the small particles obtained in particular according to the spray drying process have larger surfaces than e.g. the products obtained according to the dry process. The process is highly flexible since, in contrast to the dry processes (where tubular reactors are used), it is carried out in commonly used mixing and drying facilities. The flexibility of the process according to the invention is also demonstrated by the fact that it can be carried out not only by the batchwise but also by the continuous method in an easily controlled manner.

The following examples serve to further explain the invention without, however, limiting it in its scope.

EXAMPLES

Example 1

PCS was produced according to the process of the invention by means of a batchwise method. For this purpose, an aqueous hydrogen peroxide solution was introduced with cooling into a mixer and soda was metered in after the addition of stabilizer. A damp product was obtained as reaction slurry which exhibited the consistency of a viscous wood glue-type paste. The reaction slurry was subjected to short-term drying and the properties of the sodium percarbonate produced were examined. The production conditions and the properties of the PCS product are summarized as follows:

| | |
|---|---|
| Concentration of the aqueous hydrogen peroxide starting solution | 40% by wt. |
| Additives (per 100 g $H_2O_2$) | 5 ml Turpinal SL |
| Soda quality | light soda |
| Molar ratio $H_2O_2$:soda | 1.5:1 |
| Addition time of soda | 2 minutes |
| Total reaction time | 12 minutes |
| Starting temperature | 8° C. |
| Maximum temperature | 73° C. (after 5 minutes) |
| End temperature | 51° C. |
| Consistency of the damp product | wood glue-like viscous paste |
| Properties of the dry PCS product: | |
| a) Active oxygen | 14.5% by wt. |
| b) Loss of stability (2 h/105° C.) | 4.5% by wt |
| c) LKB value (40° C.) | 9.1 µw/g |
| LKB value in detergent base | 28 µw/g |
| d) DSC decomposition peak temp. | 161.7° C. |

Instead of the batchwise production method described above, the PCS product according to the invention can also be produced continuously.

Example 2

According to this example, PCS was produced by using the spray drying process. For this purpose, a slurry feed for the spray dryer was produced in a stirred vessel with a cooling jacket. The slurry was subsequently extremely finely ground in a colloidal mill and immediately thereafter passed to the spray drying stage.

A. Preparation of the Feed

Several small batches of approximately 100 kg feed were prepared for the spray drying tests. The optimization of the feed preparation resulted in a satisfactorily atomisable slurry. The following basic formulation and the process for slurry preparation were found to be the most advantageous conditions for achieving a slurry with as small a particle size as possible and an acceptable viscosity:

45 kg 50% by wt. aqueous hydrogen peroxide solution (15 to 20° C.) were introduced into a stirred vessel with a cooling jacket (tap water at 6 to 7° C.).

24 kg tap water (6 to 7° C.) were added to adjust the $H_2O_2$ concentration.

43 kg soda ($Na_2CO_3$) were slowly added with cooling and intensive stirring (blade agitator, 500 to 800 rpm) via a metering screw over approximately 30 to 60 minutes.

The reaction slurry obtained above was transferred into a PUC colloidal mill. Here, grinding was carried out for 5 to 10 minutes batchwise with 30 to 45 kg reaction slurry with recirculation. Grinding of the reaction slurry in the colloidal mill always took place directly before spray drying.

In those cases where water glass was added, this was done in particular at the beginning of colloidal mill grinding of the reaction slurry.

Further details on the preparation of the feed are given in table 1.

TABLE I

| | | Feed Recipe | | | | | | | |
|---|---|---|---|---|---|---|---|---|---|
| Mixture No. | | A | | | B | | | C | D |
| for experiment no. | | 1 | 2 | 3 | 4 | 5a | 5b | 6 | 7 | 8 |
| 50% by wt $H_2O_2$ | (kg) | | 45.0 | | | 45.0 | | | 45.0 | 22.5 |
| Water | (kg) | | 24.5 | | | 19.0 | | | 24.0 | 12.0 |
| Soda | (kg) | | 43.0 | | | 43.0 | | | 43.0 | 21.5 |
| Sum Total | (kg) | | 112.5 | | | 107.0 | | | 112.0 | 56.0 |
| Dry Substance[1] % by wt. | | | 57 | | | 60 | | | 57 | 57 |
| Batch Quantity | (kg) | | — | | 30 | 30 | 47.5 | 30 | 35 | 56 |
| Water glass 36% by wt. | (kg) | | — | | 0.35 | 0.70 | 1.1 | — | 0.40 | 1.25 |
| Additional water | (kg) | | — | | 0 | — | 6.0 | — | 0 | 0 |
| $SiO_2$ % by wt. | | | 0 | | 0.5 | 1.0 | 1.0 | 0 | 0.5 | 1.0 |
| Dry substance[1] % by wt. | | | 57 | | 60 | 50–55 | 53 | 57 | 57 | 57 |

[1]Results calculated in % by wt PCS (as $Na_2CO_3 \cdot 1.5\ H_2O_2$), based on the amount of soda used.

B. Spray Drying

The slurry produced under A was spray dried in the following tests in a spray dryer with an integrated fluid bed.

| Spray drying data: | |
|---|---|
| Feed: | 55 to 57% by wt. DS, 25 to 30° C. |
| Atomising: | 2-substance nozzle at 3 bar air pressure |
| Inlet temperature: | 250° C. |
| Inlet temperature (fluid bed): | 55° C. |
| Discharge temp. | 84 to 86° C. |
| The following product properties were achieved: | |
| Water content: | 0.0% (Mettler, 15 min./55° C.) |
| average particle size: | 30 to 70 μm (Malvern, dry) |
| bulk density: | 550 to 650 g/l |
| tamped weight: | 730 to 830 g/l |

The spray drying operation took place without problems. However, care must be taken during the preparation of the feed to avoid the formation of lumps during the dissolution of the sodium carbonate (soda) and to reduce the viscosity (particularly on addition of water glass). The spray dried PCS particles could be compacted without problems. During compacting of spray dried sodium percarbonate powder it is possible to use only water as agglomerating liquid. However, since the agglomerates thus produced are still weak, it is recommended to add water glass or other granulating aids to the agglomerating liquid. This improves the strength of the agglomerates. It has been found that at least 1% by wt., calculated as $SiO_2$ based on dry substance, ought to be added but not more than 3% by wt. Excellent products are obtained in particular with 1% by weight $SiO_2$, these products containing only up to approximately 5% by wt. non-agglomerated product.

The data from the spray drying tests 1 to 8 which were carried out are reproduced in Table II.

TABLE II

| Test no. | | 1 | 2 | 3 | 4 | 5a | 5b | 6 | 7 | 8 |
|---|---|---|---|---|---|---|---|---|---|---|
| Duration | h:min. | 1:25 | 1:00 | 0:55 | 0:50 | 1:50 | 0:55 | 0:45 | 0:50 | 0:50 |
| FEED: | | | | | | | | | | |
| Concentration[1] | % by wt. DS | 57 | 57 | 57 | 60 | 50–55 | 53 | 57 | 57 | 57 |
| $SiO_2$ concentration | % by wt. | 0 | 0 | 0 | 0.5 | 1.0 | 1.0 | 0 | 0.5 | 1.0 |
| pH | | 10.6 | 10.6 | 10.6 | 10.6 | 10.6 | 10.6 | 10.6 | 10.6 | 10.6 |
| Temperature | ° C. | 24 | 24 | 24 | 28 | 28 | 28 | 28 | 28 | 25 |
| Atomisation: | | | | | | | | | | |
| Air pressure | bar | 2.0 | 3.0 | 3.0 | 3.0 | 3.0 | 3.0 | 3.0 | 3.0 | 3.0 |
| Quantity of air | kg/h | 22.2 | 29.3 | 29.3 | 30.0 | 30.0 | 29.7 | 30.0 | 27.7 | 30.0 |
| DRYING: | | | | | | | | | | |
| Main air temperature | ° C. | 153 | 200 | 250 | 250 | 250 | 250 | 250 | 250 | 250 |
| IFB air temperature | ° C. | 55 | 55 | 55 | 55 | 55 | 55 | 55 | 55 | 55 |
| Discharge temperature | ° C. | 83 | 82 | 86 | 85 | 86 | 86 | 86 | 85 | 84 |
| Main air amount[2] | kg/h | 305 | 305 | 305 | 310 | 310 | 310 | 305 | 305 | 305 |
| IFB air amount[2] | kg/h | 115 | 115 | 115 | 115 | 115 | 115 | 85 | 90 | 95 |
| Discharge air amount[3] | kg/h | 480 | 475 | 465 | 480 | 475 | 465 | 465 | 470 | 475 |
| P (tower) | mmWC | −15 | −10 | −10 | −5 | −10 | −10 | −12 | −12 | −10 |
| dP (cyclone) | mmWC | 80 | 78 | 75 | 80 | 78 | 78 | 75 | 77 | 80 |
| PRODUCT: | | | | | | | | | | |
| dP(IFB powder layer) | mmWC | 40 | 40 | 35 | 40 | 40 | 35 | 50 | 30 | 40 |
| IFB powder temperature | ° C. | 65 | 67 | 68 | 66 | 67 | 66 | 63 | 54 | 45 |
| Powder produced | kg | 5.4 | 8.3 | 10.0 | 14.7 | 23.8 | 15.9 | 14.9 | 18.1 | 14.6 |
| Water content[4] | % by wt. | 0.0 | 0.0 | 0.0 | 0.0 | 0.0 | 0.0 | 0.0 | 0.0 | 0.0 |
| Bulk density | g/cm³ | 0.62 | 0.59 | 0.61 | 0.65 | 0.54 | 0.51 | 0.63 | 0.60 | 0.65 |
| Tamped density 100 x | g/cm³ | 0.77 | 0.75 | 0.75 | 0.81 | 0.73 | 0.79 | 0.79 | 0.77 | 0.83 |
| Particle distribution:[5] | | | | | | | | | | |
| Average particle size | μm | 64 | 37 | 70 | 64 | 32 | 26 | 98 | 54 | 45 |

[1] Results calculated in % by wt PCS (as $Na_2CO_3 \cdot 1.5\, H_2O_2$) based on the amount of soda used
[2] Based on the pressure drop via baffle in the inlet duct
[3] Based on the loss of pressure via cyclone in the discharge duct.
[4] Determined according to Mettler, 15 mins./55° C.
[5] Determination of the particle size distribution according to Malvern: dry, 0.25 bar

Example 3

The spray dried PCS powders produced according to Example 2 were granulated in a compacting facility of the type of a V-mixer. The V-mixer is a universal mixer/granulator for light or intensive dry mixing, liquid/solid mixing and granulation. The capacity of the V-mixer was 7.5 l/batch and the maximum bulk density of the feed was 4 kg/l. The maximum speed of the blades was 17 m/second. The blades were fixed to a stainless liquid dispersion shaft which could be disassembled and were used to mechanically fluidize the substance to be mixed/granulated. As a result, the agglomeration liquid atomized into the powder was satisfactorily distributed and, after achieving a certain moisture level, the agglomeration began without problems. Granulation tests were carried out both with water alone used as agglomeration liquid and with an addition of water glass. The process conditions and results are given in Table III.

TABLE III

Granulation tests in the V-mixer with subsequent fluid bed drying

| Test no. | 1 | 2 | 3 | 4 |
|---|---|---|---|---|
| PCS powder | | | | |
| Quantity (g) | 4000 | 3276 | 4003 | 4000 |
| Bulk density (g/ml) | 0.62 | 0.63 | 0.62 | 0.62 |
| Granulating liquid | | | | |
| water (g) | 843 | 142 | 686 | 686 |
| water glass (g)[1] | 157 | 0 | 314 | 314 |
| additional water (g) | 0 | 0 | 305 | 315 |
| V-mixer | | | | |
| Gap adjustment mm) | 0.2 | 0.2 | 0.2 | 0.2 |
| Blade, number/size | 8/large | 8/large | 8/large | 8/large |
| Speed (rpm) | 2450 | 2450 | 2450 | 2450 |
| Liquid addition time (s) | 900 | 180 | 900 | 720 |
| Addition time additional water (s) | 0 | 0 | 300 | 300 |
| Product moisture level wt. % | 17.1 | 20.0 | 17.0 | 20.9 |
| Bulk density kg/l | 0.63 | 0.70 | 0.68 | — |
| Tamped weight 100 x (kg/l) | 0.91 | 0.93 | 0.92 | — |
| Grain distribution D50 ($\mu$m) | 510 | — | — | — |
| Fluid bed dryer | | | | |
| Batch quantity (g) | 800 | 912 | 1000 | 1200 |
| Cyclone fraction (g) | 145 | 133 | 108 | −60 |
| cyclone fraction (% by wt.) | 16 | 15 | 11 | 5 |
| Granulated product, dry | | | | |
| Residual moisture (% by wt) | 0.0 | 0.0 | 0.0 | 0.0 |
| Bulk density (kg/l) | 0.70 | 0.78 | 0.73 | 0.75 |
| Tamped density 100 x (kg/l) | 0.87 | 0.85 | 0.77 | 0.81 |
| Grain distribution | | | | |
| D 90 ($\mu$m) | 1200 | 1100 | 1300 | 1000 |
| D 50 ($\mu$m) | 630 | 373 | 457 | 414 |
| D 10 ($\mu$m) | 250 | 148 | 171 | 177 |

[1]Water glass: $Na_2O_2$ = 8 wt. %, $SiO_2$ = 25.5 wt. % (1:3)

Example 4

A PCS product with approximately 10% by wt. active oxygen was produced in the same way as in example 2. The process conditions, insofar as these are not given in example 2, and the properties of the resulting product were as follows:

| Preparation of the slurry | |
|---|---|
| 25 kg $H_2O_2$ 10% by wt. | Temperature <25° C. |
| 125 ml Turpinal | Total $H_2O$: 67.8% by wt. |
| 8.16 kg soda | slurry sieved to 1 mm |

Active oxygen: 10.54% by wt. (theoretical)

Rotational speed: 100 rpm. After adding the soda, the cutter head was started up and mixing carried out for 10 minutes. Subsequently, mixing was continued for a further 10 minutes at 277 rpm. The slurry was sieved through a 1.0 mm sieve.

| Drying of the slurry: | | |
|---|---|---|
| Spray dryer | | |
| Input air: | 112–132° C. | (corresponding to a pump output of ca. 24%) |
| Discharge air: | 74–77° C. | |
| Analyses of the PCS product: | | |
| Avox: | 10.24–11.04% by wt. | (average value: 10.96% by wt.) |
| Bulk density: | 0.56 kg/l | |
| pH: | 10.65 (1% by wt. solution) | |
| Loss of stability: | 18.5% (2 h, 105° C.) | |
| | 1.8–2.2% (2 h, 80° C.) | |

The soda content of the product was clearly shown to be soda* monohydrate (100° C.) by DSC spectra. Based on the endothermic amount of heat (J/g), it was possible to conclude that the entire unreacted quantity of soda was present as $Na_2CO_3.H_2O$. In calculating the theoretical active oxygen content, it is therefore necessary to use $Na_2CO_3.H_2O$ rather than $Na_2CO_3$.

| Legends | |
|---|---|
| PCS = | Sodium percarbonate |
| Avox = | Active oxygen (content) |
| Turpinal SL = | Aqueous 60% by wt. solution of 1-hydroxyethane-1,1-diphosphonic acid (HEDP): Stabilizer for peroxides |
| DS = | Dry substance |
| Water glass = | 36% by wt. solution of sodium silicate in water (8% by wt. $Na_2O$; 25.5% by wt. $SiO_2$) |
| IFB = | Integrated fluid bed |
| h = | hour |
| min. = | minutes |
| mmWC = | mm water column |
| P, dP = | Pressure, pressure difference |
| rpm = | revolutions per minute |
| DSC = | Differential scanning calorimetry. DSC determines all processes in which energy is consumed or released, i.e. endothermic and exothermic phase transformations. |
| LKB measurement = | Heat flow measurements. In the case of these heat flow measurements, the heat flows which occur under isothermic conditions of measurement provide information on the stability of the product containing active oxygen; in particular, the stability of the product in the presence of washing agent components can be determined by carrying out the heat flow measurements on samples in which the active oxygen-containing product is present after having |

| | |
|---|---|
| | been mixed with the detergent components. The heat flow measurements were carried out in an LKB 2277 Bio Activity Monitor at 40° C. over a period of 20 hours. The lower the heat flow measured, the higher is the stability of the active oxygen-containing product in the detergent base, and the more stable are the PCS particles concerned. |
| Loss of Avox, = Avox Stability Loss of stability | To determine the chemical stability of the sodium percarbonate produced, the active oxygen loss (Avox stability) was determined. For this purpose, the product was heated for 2 hours to 105° C. and the loss of active oxygen caused by decomposition was determined. The determination of the active oxygen content took place according to the usual titrimetric methods. |

What is claimed is:

1. A process for producing sodium percarbonate particles comprising the steps of:
   a) introducing a 30 to 50% by weight aqueous hydrogen peroxide solution into a receiving vessel; metering in solid soda in an amount in approximately 1.1 to 0.6 times the molar amount of hydrogen peroxide, and intensively mixing the resulting mixture at a temperature of at most 80° C. for a period sufficient to allow the hydrogen peroxide and soda to react to form a slurry of sodium percarbonate particles having a water content of no more than about 40% by weight;
   b1) comminuting the particle suspension obtained in step a) by wet comminution to form a ground, homogeneous particle slurry; and
   b2) immediately thereafter spray drying the ground, homogeneous particle slurry obtained in step b1) and recovering homogeneous sodium percarbonate particles having an active oxygen content of at least 13.5% by weight.

2. A process according to claim 1, wherein particles of said ground, homogeneous particle slurry have a particle size of about 1 to 30 μm.

3. A process according to claim 1, wherein the wet comminution in step 1) is carried out by spray drying.

4. A process according to claim 1, further comprising granulating the sodium percarbonate particles simultaneously with or subsequently to said drying.

5. A process according to claim 1, wherein said solid soda is light soda.

6. A process according to claim 1, further comprising setting an initial temperature of the reaction in step a) to a temperature below room temperature.

7. A process according to claim 1, wherein the reaction in step a) is carried out in an intensive mixer.

8. A process according to claim 1, wherein said process is carried out continuously.

9. A process according to claim 1, wherein the recovered sodium percarbonate particles have an active oxygen content in the range from 13.5 to 14.5% by weight.

10. A process according to claim 1, wherein the recovered sodium percarbonate particles have a grain size of 350 to 1,300 μm.

11. A process according to claim 1, wherein the recovered sodium percarbonate particles have a bulk density in the range from 0.2 kg/liter to 1.5 kg/liter.

12. A process according to claim 6, wherein the temperature is in the range from 3 to 10° C.

13. A process according to claim 11, wherein the recovered sodium percarbonate particles have a bulk density in the range from 0.5 kg/liter to 1.1 kg/liter.

* * * * *